United States Patent
Wang et al.

(10) Patent No.: US 6,432,213 B2
(45) Date of Patent: Aug. 13, 2002

(54) TUBE SCRAPER

(75) Inventors: Demao Wang, Toronto; Bill Sotirakos, Thornhill, both of (CA)

(73) Assignee: Photoscience Japan Corporation, Tokyo (JP)

(*) Notice: Subject to any disclaimer, the term of this patent is extended or adjusted under 35 U.S.C. 154(b) by 6 days.

(21) Appl. No.: 09/794,654

(22) Filed: Feb. 27, 2001

(30) Foreign Application Priority Data

Apr. 20, 2000 (CA) .............................................. 2306546

(51) Int. Cl.$^7$ ................................................ B08B 9/023
(52) U.S. Cl. .................. 134/6; 15/104.04; 250/431; 422/186.3
(58) Field of Search ................ 15/104.04, 104.03, 15/246, 220.4; 134/6, 9; 250/428–432 PD; 422/186.3

(56) References Cited

U.S. PATENT DOCUMENTS

| | | | |
|---|---|---|---|
| 1,134,342 A | | 4/1915 | Maier |
| 1,253,363 A | * | 1/1918 | Farr et al. |
| 1,899,379 A | | 2/1933 | Adams |
| 2,732,502 A | | 1/1956 | Darney |
| 2,843,168 A | * | 7/1958 | Lun |
| 3,061,721 A | | 10/1962 | Brenner |
| 3,138,430 A | | 6/1964 | Rafael et al. |
| 3,138,708 A | | 6/1964 | Ellner et al. |
| 3,182,191 A | | 5/1965 | McFarland et al. |
| 3,182,193 A | | 5/1965 | Ellner et al. |
| 3,336,099 A | | 8/1967 | Czulak et al. |
| 3,456,107 A | | 7/1969 | Robertson |
| 3,485,576 A | | 12/1969 | McRae et al. |
| 3,562,520 A | | 2/1971 | Hippen |
| 3,634,025 A | | 1/1972 | Landry |
| 3,837,800 A | | 9/1974 | Wood |
| 3,844,661 A | | 10/1974 | Birkett et al. |
| 3,904,363 A | | 9/1975 | Free |
| 4,002,918 A | | 1/1977 | Graentzel |

(List continued on next page.)

FOREIGN PATENT DOCUMENTS

| | | |
|---|---|---|
| CA | 2239925 | 3/1994 |
| CA | 2117040 | 2/1999 |
| CA | 2160729 | 12/1999 |
| DE | 2 003 989 A | 8/1971 |
| DE | 25 49 321 A1 | 5/1975 |
| DE | 42 13 021 A1 | 10/1993 |
| DE | 37 10 250 C3 | 11/1993 |
| EP | 0 467 465 A1 | 7/1990 |
| EP | 0 811 579 A2 | 3/1993 |
| WO | WO 94/20280 | 12/1994 |
| WO | WO 96/11880 | 4/1996 |
| WO | WO 98/27011 | 6/1998 |
| WO | WO 00/26144 | 5/2000 |
| WO | WO 00/51943 | 9/2000 |
| WO | WO 00/73212 A1 | 12/2000 |

*Primary Examiner*—Terrence R. Till
(74) *Attorney, Agent, or Firm*—Sheridan Ross PC

(57) ABSTRACT

A scraper for removing deposits from the exterior of a tubular member includes elements defining an outer jacket which has an inwardly open circumferential recess and two aligned axial openings, and a scraper element in the form of an elongate resilient wire bent to define a series of integral, concatenated, resilient segments, each pair of adjacent segments being connected through a bend or geniculation. All geniculations are received within the recess, and each segment of wire extends generally along a chord of the aligned axial openings. The positions of the chords are distributed around the circumference of the axial openings such that, in order for the tubular member to be accommodated through the aligned openings, the various segments must be deformed outwardly, whereby the resilience of the thus deformed segment urges it inwardly against the tubular member, and causes it to clean the tubular member as the scraper moves axially.

10 Claims, 1 Drawing Sheet

U.S. PATENT DOCUMENTS

| | | |
|---|---|---|
| 4,017,734 A | 4/1977 | Ross |
| 4,102,645 A | 7/1978 | Meacham, Jr. et al. |
| 4,103,167 A | 7/1978 | Ellner |
| 4,151,085 A | 4/1979 | Malik |
| 4,201,917 A | 5/1980 | Graentzel |
| 4,358,204 A | 11/1982 | Ellner |
| 4,621,386 A | 11/1986 | Hill |
| 4,728,368 A | 3/1988 | Pedzisiatr |
| 4,752,401 A | 6/1988 | Bodenstein |
| 4,766,321 A | 8/1988 | Lew et al. |
| 4,849,100 A | 7/1989 | Papandrea |
| 4,899,056 A | 2/1990 | Ellner |
| 4,922,114 A | 5/1990 | Boehme |
| 4,940,902 A | 7/1990 | Mechalas et al. |
| 4,968,489 A | 11/1990 | Peterson |
| 5,005,245 A | 4/1991 | Dooley et al. |
| 5,085,016 A * | 2/1992 | Rose |
| 5,151,252 A | 9/1992 | Mass |
| 5,185,531 A | 2/1993 | Wynn |
| 5,185,533 A | 2/1993 | Banks et al. |
| 5,227,140 A | 7/1993 | Hager et al. |
| 5,247,178 A | 9/1993 | Ury et al. |
| RE34,513 E | 1/1994 | Ellner |
| 5,332,388 A | 7/1994 | Schuerch et al. |
| 5,372,781 A | 12/1994 | Hallett et al. |
| 5,401,474 A | 3/1995 | Hager et al. |
| 5,418,370 A | 5/1995 | Maarschalkerweerd |
| 5,440,131 A | 8/1995 | Hutchison et al. |
| 5,501,843 A | 3/1996 | Peterson |
| 5,504,335 A | 4/1996 | Maarschalkerweerd |
| 5,528,044 A | 6/1996 | Hutchison |
| 5,534,142 A | 7/1996 | Bernardin et al. |
| 5,539,209 A | 7/1996 | Maarschalkerweerd |
| 5,539,210 A | 7/1996 | Maarschalkerweerd |
| 5,625,194 A | 4/1997 | Stitzel et al. |
| 5,660,719 A | 8/1997 | Kurtz et al. |
| 5,675,153 A | 10/1997 | Snowball |
| 5,725,757 A | 3/1998 | Binot |
| 5,792,433 A | 8/1998 | Kadoya |
| 5,874,740 A | 2/1999 | Ishiyama |
| 5,885,449 A | 3/1999 | Bergmann et al. |
| 5,937,266 A | 8/1999 | Kadoya |

* cited by examiner

TUBE SCRAPER

FIELD OF THE INVENTION

This invention relates generally to a method and apparatus for maintaining the external surface of a tubular member free of scale, deposits, and the like. This invention is particularly suited to the scraping and cleaning of protective quartz tubes used in the ultra-violet sterilisation and/or disinfection of water and other liquids, but is not limited thereto.

BACKGROUND OF THE INVENTION

It is well known to use ultraviolet light in the sterilisation and/or disinfection of water. In addition, ultraviolet light may be used to effect other treatments or reactions in fluids, including water and air. The ultraviolet light is typically obtained from a lamp that is in the form of a straight hollow tube of a material transparent to ultraviolet light, especially a quartz tube. A quartz sheath may also be used. Electrical connections extend through the sealed ends of the tubes, and these electrical connections are protected from contact with the fluid.

The surface of the ultraviolet lamp, or outer sheath if used, tends to accumulate scale, deposits or the like, especially after a period of continuous use. The problems of scale and other deposits are partially acute in the treatment of water. Accumulation of scale and other deposits on the surface of the tube reduces the transmission of ultraviolet light from the lamp into the fluid. This causes a decrease in the intensity of the light and consequently the efficiency and effectiveness of the treatment decreases. In the treatment of water, cleaning of the outer surface of the tube may be required weekly, daily or even more frequently, depending on the quality of the water being treated.

Cleaning of the tubes could be effected by removal of the tubes from the fluid and scraping or chemical treatment. In the typical situation of use of a plurality of tubes in a cluster, this might require partial disassembly of the apparatus and extended down-time in the use of the apparatus.

Various methods have been developed for cleaning of tubes without removal of the tubes from the fluid, using brushes, wipers or the like. One such system is disclosed in U.S. Pat. No. 5,266,280, issued Nov. 30, 1993 to Hallett. In this system, a cylindrical UV-transparent sheath is utilized to isolate a UV lamp from the interior space of a reactor vessel. The sheath is sealed in such a way as to isolate the UV lamp from the fluid. A brush device is provided for brushing the exterior surface of the sheath to remove materials deposited from the fluid. The brush device has at least two brushes with bristles extending radially inwardly towards the sheath as the brushes encompass the sheath. The brushes are coupled together in spaced-apart manner on the sheath with a device for reciprocating the brushes along the exterior of the sheath, preferably on a periodic basis.

U.S. Pat. No. 3,462,597, issued on Aug. 19, 1969 to Young, discloses a UV lamp system for water purification that includes a wiper system for the protective sheath surrounding the UV lamp. The wiper system comprises wiper rings made from Teflon™ or like material not affected by UV radiation. The rings are spaced apart from one another and are preferably split so that they can be elastically or resiliently held on the outside of the protective tube by a spring. The wiping ring is connected to a ring holder which is engaged by a rod that extends through an end of the reactor. The ring holder is then reciprocated to provide a wiping action along the protective tube to remove physical or biological materials that have deposited on the outside of the tube. However, the system would seem to be inadequate to accommodate dimensional variations in the protective tube, which is normally made of quartz. Further, use of wiper rings made of Teflon™ fluoropolymer or similar material would not clean the quartz surface due to a) the lack of a sharp, hard scraping surface (such as a razor) and b) the inherent slipperiness of Teflon fluoropolymer.

U.S. Pat. No. 3,562,520, issued on Feb., 1971 to Hippen, discloses the use of a wiper system to routinely clean a protective quartz tube surrounding a UV lamp. The wiper system includes a number of ring-like wiper elements surrounding and in wiping contact with the external surface of the protective tube. The wiper assembly is urged along the tube by a coil spring. When water to be treated flows through the reactor, the wiper returns to the other end of the tube to effect a wiping of the area of the tube between the inlet and outlet. This is said to ensure that the protective tube is free of deposits during each start-up of the water purifying device.

U.S. Pat. No. 3,904,363, issued on Sep. 9, 1975 to Free, discloses a wiper system that is also activated by water flow. However, for extended continuous water flow, the protective tube would not be cleaned. Water flow moves the wiper system to one end of the tube and keeps it there. When the water shuts off, the wipers descend to the base of the reactor under the influence of gravity. The wiper system includes a flexible semi-rigid plastic or flexible metal membrane. The membrane may be a brush-like textured membrane of composite or plastic material. However, the membrane is very thin and is likely to be inadequate to remove stubborn deposits on the protective sheath. Also, the plastic version of the wiper would be subject to deterioration under a high intensity UV radiation from high powered lamps.

The inability of the devices disclosed in U.S. Pat. Nos. 3,562,520 and 3,904,363 to operate with a continuous flow of water would mean that an extended water flow through the device would result in the gradual build-up of deposits on the protective tube. This would reduce the transmittal of UV light, and consequently the effectiveness of the UV radiation in treating bacteria.

U.S. Pat. No. 5,528,044, issued on Jun. 18, 1996 to Hutchinson discloses use of a wiper assembly having a rod that can be moved from outside the reactor chamber to mechanically reciprocate the wiper assembly. The wiper assembly has a plate with a plurality of radial inwardly extending finger members that engage the outer surface of the tube surrounding the lamp.

Additional patents are U.S. Pat. Nos. 4,482,809, 4,872, 980, 5,006,244 and 5,418,370, all issued to Maarschalkerweerd. In the devices described in first three of these patents, the sleeve surrounding the UV lamps becomes periodically fouled with foreign materials, and then requires manual cleaning to remove such materials. The latter patent overcomes this disadvantage by providing a cleaning apparatus which incorporates a cleaning sleeve engaging a portion of the exterior of the radiation source assembly and moveable between a retracted position and an extended position. The cleaning sleeve includes the chamber in contact with part of the radiation source, which chamber is supplied with a cleaning solution suitable to remove undesired materials. Such a method and apparatus for cleaning tends to be relatively complicated and expensive.

A simple and effective method and apparatus for cleaning the exterior surfaces of tubes would be beneficial.

SUMMARY OF THE INVENTION

In view of the disadvantages of the prior art enumerated above, it is an object of one aspect of this invention to provide a scraper for removing deposits from the exterior of a tubular member such as a protective quartz sheath.

Accordingly, one aspect of the present invention provides, for the removal of deposits from the exterior of a tubular member, a scraper comprising:

an outer jacket defining an inwardly open circumferential recess and two aligned axial openings, a scraper element in the form of an elongate resilient wire bent to define a series of integral, concatenated, resilient segments, each pair of adjacent segments being connected through a geniculation, the geniculations being received within said recess with at least one segment extending substantially along a chord of the aligned axial openings, whereby, in order to accommodate the tubular member through said aligned axial openings, the tubular member must deform said at least one segment outwardly, so that the resilience of the deformed segment urges it inwardly against the tubular member and causes it to clean the tubular member as the scraper moves axially relative to the tubular member.

A further aspect of the present invention provides a method of removing deposits from the exterior of a tubular member, the method comprising:

providing a scraper which includes:

an outer jacket defining an inwardly open circumferential recess and two aligned axial openings, and a scraper element in the form of an elongate resilient wire bent to define a series of integral, concatenated, resilient segments, each pair of adjacent segments being connected through a geniculation, the geniculations being received within said recess with at least one segment extending substantially along a chord of the aligned axial openings, and inserting the tubular member through said aligned openings so as to deform said at least one segment outwardly, whereby the resilience of the deformed segment urges it inwardly against the tubular member and causes it to clean the tubular member as the scraper moves axially relative to the tubular member.

BRIEF DESCRIPTION OF THE DRAWINGS

Two embodiments of this invention are illustrated in the accompanying drawings, in which like numerals denote like parts throughout the several views, and in which.

DETAILED DESCRIPTION OF THE INVENTION

The present invention provides a scraper for removing deposits from the exterior of a tubular member, such as a tubular quartz sheath. In particular embodiments, the scraper provides a scraper element for contacting the tubular member. Such a scraper element may take the form of an elongate resilient wire held within an outer jacket so as to present segments of the wire extending along chords of aligned axial openings. In this manner, the tubular member can be accommodated through the openings only by deforming the wire segments outwardly. The resilience of the segments urges them against the tubular member and longitudinal movement of the scraper, resulting in cleaning of the surface of the tubular member.

Figure 1:
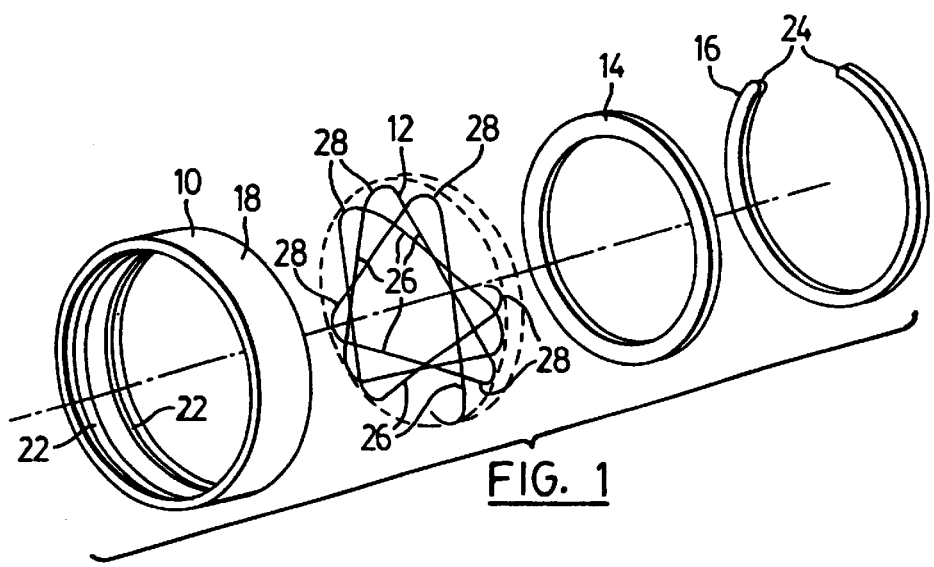
FIG. 1 is an exploded, perspective view of the main components of one embodiment of this invention.

Attention is first directed to FIG. 1, which illustrates the four basic elements of the scraper 9 described herein. The four elements are seen in axially aligned but exploded relation, for clarity.

Shown at the extreme left in FIG. 1 is an outer jacket 10, to the right of which is a scraper element 12, followed by a washer 14 and a circlip 16. While FIG. 1 shows only one washer 14 and one circlip 16, it is to be understood that the complete assembly requires two washers and two circlips.

Figure 2:
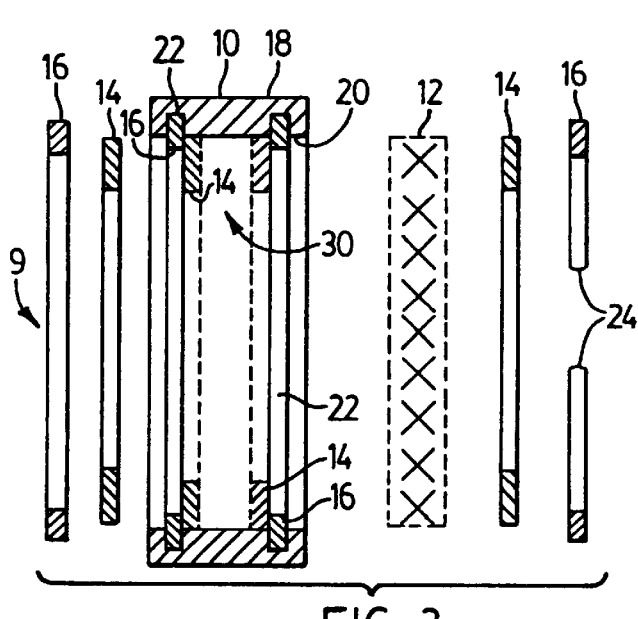
FIG. 2 is an axial sectional view of the primary components seen in FIG. 1, also in exploded relation.

As best seen in FIG. 2, the outer jacket 10 has the shape of a hollow circular cylinder with an outer cylindrical wall 18 and an inner cylindrical wall 20. In the inner cylindrical wall 20 are provided two spaced-apart grooves 22, each adapted to receive a circlip 16. Each circlip 16 is sized so as to resiliently "snap" into position within the corresponding groove 22. As best seen in FIG. 1, each circlip 16 is a penannular member, shaped such that the free ends 24 can resiliently approach each other to make the effective diameter smaller and allow it to be snapped into position.

The circlips 16 are spaced axially away from each other to allow the inclusion of the two washers 14, each lying immediately adjacent one of the circlips 16 (shown in broken lines within the jacket 10), and also containing the scraper element 12, this lying between the washers 14.

To avoid confusion, it should be explained that FIG. 2 shows each circlip 16 in two positions: both outside and inside the jacket 10, and similarly, each washer 14 is shown both outside and inside the jacket 10. The inside positions for all such elements are in broken lines.

Returning to FIG. 1, the scraper element 12 takes the form of an elongate resilient wire bent to define a series of integral, concatenated, resilient segments 26, with each pair of adjacent segments 26 being connected through a geniculation 28. The geniculations 28 are rounded. When so bent, the scraper element consists of a series of relatively straight portions connected in sequence by rounded portions. More accurately, the scraper element 12 of a preferred embodiment is formed by bending a resilient wire to form a series of approximate triangles with blunt apices, in such a way that each geniculation is at a location closely adjacent to, but not coincident with, the locations of the geniculations which are three segments away from the given geniculation in either direction.

The scraper element 12 is received within a recess defined by the jacket 10 and the two washers 14, this being identified by the numeral 30 in FIG. 2.

Figure 5:
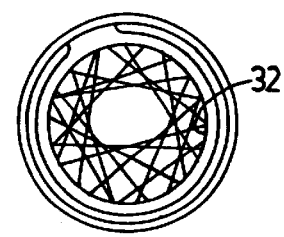
FIG. 5 is an axial view of the scraper, showing a number of wire segments.

As can be seen in FIG. 5, the result of bending the elongate resilient wire into the shape seen in FIG. 1 is that substantially all of the wire segments extend substantially along chords of the aligned axial openings 32 which are defined by the washers 14.

Figure 3:
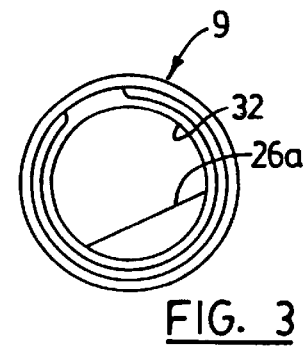
FIG. 3 is an end elevation of the assembled scraper of which the parts are shown in FIGS. 1 and 2, illustrating the theoretical positioning of one segment of a scraper element (made of bent wire), to illustrate the principle of the invention.
Figure 4:
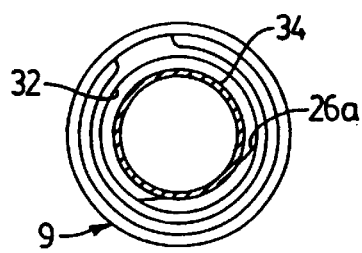
FIG. 4 is a view similar to FIG. 3, showing a tubular member in transverse section passing through aligned openings of a jacket member, with the tubular member bending the scraper segment out of position, thus creating inward pressure, allowing the wire segment to clean a portion of the surface of the tubular member.

To illustrate theoretically what is happening, attention is directed to FIG. 3, which shows only a single wire segment 26a extending along a chord of the opening 32. Comparing FIGS. 3 and 4, it will be seen that when a tubular member (shown in transverse section at 34 in FIG. 4) takes up a central position within the opening 32, it can only do so by forcing the wire segment 26a outwardly. However, because the wire is resilient, it will seek to remain in the position of FIG. 3, and its outwardly deflection will cause it to push inwardly against the outer surface of the tubular member 34, thus allowing it to carry out a scraping and cleaning action on the surface when the scraper 9 moves along the tubular member 34. By arranging for substantially all of the wire segments to press inwardly against the tubular member in the same way, there will occur a multiple scraping action which is highly effective and efficient.

As previously pointed out, FIG. 5 is a more accurate depiction of the scraper configuration.

It should be further pointed out that the number of wire segments seen in FIG. 1 is far less than the actual practical number, which is closer to about 100.

Figure 6:
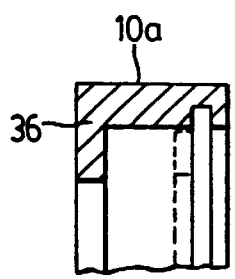
FIG. 6 is an axial sectional view of a portion of the main holding element of the second embodiment, which is similar to the same element in FIG. 2.

In the embodiment shown in FIG. 6, the left side of the jacket 10a is changed to a simple inward projecting flange 36, which performs the same function as the leftward washer 14 (in FIG. 2).

Thus, it can be seen that the jacket 10, 10a, with two or with one washer (held in place by a circlip 16) defines an inwardly open circumferential recess 30 and two aligned axial openings 32.

To enhance the scraping function of the scraper element 12, the resilient wire may be non-round in transverse section. Preferably the resilient wire has a polygonal cross-section, which, even more preferably, is a square cross-section.

Figure 7:
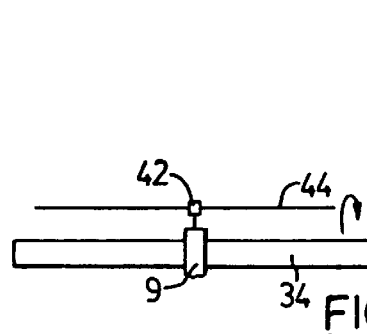
FIG. 7 is a schematic side elevation showing a tubular member, a scraper member, and means for moving the scraper member along the tubular member.

It is to be understood that the scraper 9 would be mounted in association with means adapted to support it in a position from which it can surround the tubular member, and can be moved axially relative to the tubular member. This is schematically shown in FIG. 7, depicting a tube 34, a scraper 9 connected to a carriage member 42 adapted to move longitudinally along a threaded screw 44. As the screw 44 is rotated, the carriage 42 will be moved to the left or to the right (depending upon the sense of the rotation), and will carry the scraper 9 longitudinally of the tubular member 34.

While two embodiments of this invention have been illustrated in the accompanying drawings and described hereinabove, it will be evident to those skilled in the art that changes and modifications may be made therein without departing from the essence of this invention, as set forth in the accompanying claims.

We claim:

1. For the removal of deposits from the exterior of a tubular member, a scraper comprising:
    an outer jacket defining an inwardly open circumferential recess and two aligned axial openings,
    a scraper element in the form of an elongate resilient wire bent to define a series of integral, concatenated, resilient segments, each pair of adjacent segments being connected through a geniculation,
    the geniculations being received within said recess with at least one segment extending substantially along a chord of the aligned axial openings,
    whereby, in order to accommodate the tubular member through said aligned axial openings, the tubular member must deform said at least one segment outwardly, so that the resilience of the deformed segment urges it inwardly against the tubular member and causes it to clean the tubular member as the scraper moves axially relative to the tubular member.

2. The scraper of claim 1 in which the resilient wire is non-round in transverse section.

3. The scraper of claim 1 in which the resilient wire has a polygonal cross-section.

4. The scraper of claim 1 in which the resilient wire has a square cross-section.

5. The scraper of claim 1 in which the bending of the resilient wire is such that a given geniculation lies within the recess at a location closely adjacent to, but not coincident with, the locations of the geniculations which are three segments away from the given geniculation in either direction.

6. The scraper of claim 1 in which the aligned openings are substantially circular, and in which substantially all wire segments extend substantially along chords of the aligned openings.

7. The scraper of claim 1 in combination with means for supporting the scraper in a position in which it can surround the tubular member, and can move axially relative to the tubular member.

8. The scraper of claim 7 in which the bending of the resilient wire is such that a given geniculation lies within the recess at a location closely adjacent to, but not coincident with, the locations of the geniculations which are three segments away from the given geniculation in either direction, all geniculations being rounded.

9. The scraper of claim 1 in which said outer jacket includes a cylindrical outer member, a pair of annular washers adapted to fit within said outer member in spaced-apart relation, and a pair of circlips for holding the washers in place, the outer member having internal circumferential grooves for receiving the circlips.

10. A method of removing deposits from the exterior of a tubular member, the method comprising:
    providing a scraper which includes:
        an outer jacket defining an inwardly open circumferential recess and two aligned axial openings,
        and a scraper element in the form of an elongate resilient wire bent to define a series of integral, concatenated, resilient segments, each pair of adjacent segments being connected through a geniculation,
    the geniculations being received within said recess with at least one segment extending substantially along a chord of the aligned axial openings,
    and inserting the tubular member through said aligned openings so as to deform said at least one segment outwardly, whereby the resilience of the deformed segment urges it inwardly against the tubular member and causes it to clean the tubular member as the scraper moves axially relative to the tubular member.

* * * * *